May 5, 1964  H. R. SMITH ETAL  3,131,975
SLOPE CONTROL WHEEL BRAKE CONTROL SYSTEM
Filed April 21, 1960  3 Sheets-Sheet 2

INVENTORS
DONALD L. KNOWLTON  HAROLD R. SMITH
HAROLD RAIKLEN  EUGENE H. BALSTER
ANTHONY F. WEISSENBERGER
BOBBY LILEY
BY *Charles F. Dischler*
ATTORNEY

INVENTOR.
DONALD L. KNOWLTON  HAROLD R. SMITH
HAROLD RAIKLEN  EUGENE H. BALSTER
ANTHONY F. WEISSENBERGER
BOBBY LILEY

BY Charles F. Dieckler
ATTORNEY

United States Patent Office 3,131,975
Patented May 5, 1964

3,131,975
SLOPE CONTROL WHEEL BRAKE
CONTROL SYSTEM
Harold R. Smith, San Pedro, Anthony F. Weissenberger, Los Angeles, Donald L. Knowlton, La Puente, Harold Raiklen, Long Beach, Bobby Liley, Los Angeles, and Eugene H. Balster, Sacramento, Calif., assignors to North American Aviation, Inc.
Filed Apr. 21, 1960, Ser. No. 23,844
21 Claims. (Cl. 303—21)

This invention concerns automatic means for prevention of skidding in a brake system such as may be used in modern aircraft with high landing speeds where avoidance of excessive braking is critically important.

The fundamental objective in a braking system for use during high-speed landing is the achievement of minimum necessary distance during ground roll under all types and conditions of landing surface without excessive tire wear. Where wheel brakes are employed to accomplish this, operation of the brakes at maximum efficiency is required. It is axiomatic that the most efficient operation of a wheel brake is obtained by applying that braking force which produces the maximum possible slippage without causing skidding of the tires on the landing surface. Thus, the peak of brake efficiency is precisely at the point of incipient skid. The amount of braking torque which can safely be applied without causing a skid must vary with changes in the coefficient of friction between the tires and the landing surface. The stated coefficient varies widely depending upon surface construction materials, weather conditions and tire conditions. Moreover, the amount of braking torque which can safely be applied without causing skidding varies with changes in tire pressure, vehicle weight, forward speed, and amount of lift obtained from the vehicle wings or power plant during ground roll. Some of the prior art devices control the amount of braking torque in response to one or more, but not all, of the factors enumerated above. The brake system which comprises the invention disclosed herein differs from conventional systems in that the instant system by a unique combination of elements, accurately controls the applied braking torque in response to variations in all of the enumerated factors, besides affording additional advantages which will appear from the detailed description subsequently set forth.

The brake control system disclosed herein is within the class of systems which broadly comprises a means of applying braking force to the wheels in combination with an automatic means to remove the braking force in response to one or more predetermined conditions. A common type of conventional automatic brake control system within the stated class is the inertia or deceleration sensitive type.

In brake systems of the inertia type, an inertia sensitive device causes brake release in response to a rate of deceleration in excess of a preselected rate with respect to the braked wheel, or the vehicle upon which the wheel is mounted. A time delay feature is normally provided which will prevent release of the brakes upon sudden momentary increase of said rate above the preselected value, in order to prevent a momentary deceleration jolt from releasing the brake unnecessarily. When the predetermined rate of deceleration is exceeded for the required time-delay period, the brakes are automatically released. The arbitrary selection of a particular value for the rate of deceleration at which the brakes are automatically released necessitates that certain theoretical operating conditions be assumed, only one of which is the coefficient of friction between the landing surface and the wheel upon which braking force is applied. For example, if the assumed value of the friction coefficient is low, commensurate with the most severe icing conditions which could reasonably be expected in service, then a deceleration rate which would be dangerous for a landing surface of wet ice would cause automatic release of the brake even although the actual landing surface may be dry concrete. This would result in operation of the brakes at considerably less than maximum efficiency at all conditions except on icy surfaces. Conversely, a high deceleration rate is an acceptable control limit for dry concrete but would be dangerously excessive as a limiting reference for brake operation on a snow covered surface. Thus, for inertia type brake systems, the disparity between theoretical landing conditions upon which the operating characteristics of the braking system are based, and the actual landing conditions encountered during service use of the braking system, result in but one actual condition at which the brake system will permit operation of the brake at maximum efficiency, and at all other operating conditions the brake is operated at an efficiency which varies from the maximum by an amount as high as 100%. Moreover, if the actual conditions of operation by chance happen to be in approximate agreement with the assumed theoretical conditions upon which the system operating characteristics are based, the response of the system to a deceleration rate above the predetermined rate will necessarily be delayed due to the time-delay feature referred to above. This has a deleterious effect on braking system performance in a fast moving vehicle since skidding occurs at the precise instant when the excessive braking force is applied, and any delay thereafter permits tire destruction at a rapid rate during the skid condition.

Brake systems of the type described above have been widely used in the prior art, wherein the accuracy and the efficiency achieved by the automatic brake release means did not impose an unreasonable risk or performance penalty in the devices incorporating such systems. However, with the advent of modern space and ballistic vehicles with increased weight and high landing speeds, the landing problem has changed considerably. Operation of brakes at their peak of maximum efficiency, or very closely thereat, is essential in minimizing the ground roll distance resisting from extremely high landing speeds. Conversely, the skid condition must be scrupulously avoided during high speed ground roll, as tire destruction at such speed is nearly instantaneous and would endanger the entire vehicle and all its occupants. Braking systems known to the prior art are critically inadequate to meet the new demands of modern space vehicle applications, and their use with landing gear on heavy, fast moving machines would be dangerously impractical and conceivably disastrous. The invention disclosed herein was devised to meet the particularly difficult performance requirements in a vehicle of the class mentioned.

In view of the obvious disadvantages of the prior art brake control systems, of which that described above is merely illustrative, a critical need for suitable means of limiting the ground roll of high-speed vehicles on landing has gone unfilled until the brake control system disclosed herein was invented. Thus, it is a general object of the instant invention to provide an improved electrical wheel brake control system for operation of brakes automatically at their peak of maximum efficiency by releasing the applied braking torque only when skidding is actually on the verge of occurring rather than when skidding is assumed to be imminent based on theoretical operating conditions.

In addition to the need for an automatic brake control system which permits the brake to function at maximum efficiency during all possible conditions of weather, tire surface and terrain, it is also essential in modern supersonic vehicles that the brake system operate with a minimum of time lag and without the need for highly specialized braking technique on the part of any human agent upon whose judgment the operation of the vehicle may depend. Thus, for example, in a manned vehicle moving at a rapid rate during ground roll, the brake control system should automatically operate the brakes at maximum efficiency no matter how much excess pedal force is used to initiate the braking pressure. Accordingly, it is a further object of this invention to provide an improved brake control system which automatically operates the brakes at maximum efficiency without any attention from any human agent whatsoever other than the initiation of braking pressure.

Another object of the instant invention is to provide an improved wheel brake system having automatic skid-prevention means operable to diminish the applied braking torque by an amount proportional to a function of the derivatives of wheel slip and braking torque, both with respect to time.

Another object of the instant invention is to provide an improved automatic electrical wheel brake control system having torque sensing means operable to maintain an accurate correlation between the amount of torque called for by the electrical signal which initiates braking action and the amount of torque actually applied by the brakes, in combination with means to modify the said signal in response to a variable dependent upon a function of the derivatives of the ground torque and of the slippage, both with respect to time.

A further object of the instant invention is the provision of an improved automatic electrical wheel brake system as set forth in the objects stated above, in combination with additional means for overriding the signal which initiates braking action, said additional means being operable in response to a slippage rate in excess of a predetermined rate.

An additional object of the instant invention is to provide an improved brake control system for automatically decreasing the braking force in response to a slippage rate in excess of a predetermined rate without completely releasing the brakes.

Other objects will become apparent upon a close reading of the following detailed description of an illustrative embodiment of the invention, reference being had to the accompanying drawings wherein.

Although the automatic brake control system of this invention is described herein as applied to a supersonic flying vehicle having two braked wheels, the system obviously may be applied to other various types of vehicles and to any number of wheels.

Moreover, the term "wheel" as used in this application refers generally to the rotating element which supports the weight of the vehicle upon which it is mounted, or some portion of the total weight, and includes supporting structure other than wheels, such as gears engaging a chain or belt tread. The term "wheel" as thus used also includes any element which rotates with the said supporting element by reason of attachment thereto, such as a tire. The phrase "reference speed" as used in this application refers to the rotational speed of an unbraked wheel having a tangential velocity at its perimeter equivalent to the linear velocity of the vehicle upon which the wheel is mounted. In other words, a wheel whose rotational speed can be used as a true measure of the vehicle linear velocity without correction for slippage would be rotating at reference speed. The term "slip" or "slippage" refers to a characteristic of flexible rotating elements, such as rubber tired wheels, to rotate at less than reference speed when braking torque is applied, this difference in rotating speed causing tire deflection or distortion. The term "skid" or variations thereof as used herein designates a condition in which the tire or other flexible rotating element is physically unable to distort sufficiently to accommodate the amount of slippage produced by the braking torque, and the tire begins to grate or slide on the contacting surface. In the case of a tire in contact with a concrete runway, for example, skidding results in rapid destruction of the tire. If skidding is severe, destruction may occur in less than half a second. It is emphasized that skidding starts to occur at a particular value of slippage in each case, this value depending in part upon the coefficient of friction between the wheel and the contacting surface, and the forces acting upon the wheel. It is further emphasized that skidding may occur even though a wheel may still be rotating, and the skid condition may not be identified solely with the locked wheel condition such as a wheel prevented from rotating by action of the brakes. The phrase "braking torque" as used in this application designates the total torque applied by the brakes, a portion of which is exerted in retarding rotation of the braked wheel caused by momentum torque and another portion of which is exerted in retarding rotation of the braked wheel caused by ground torque. The phrase "momentum torque" as used herein refers to that portion of the total torque causing continued rotation of the braked wheel due to its momentum, and which may be calculated by multiplying the wheel moment of inertia $I_W$ times the deceleration rate of the braked wheel. "Ground torque" $T_G$ is used herein to denote that portion of the total torque causing rotation of the braked wheel due to linear movement of the vehicle upon which the wheel is mounted, and which may be calculated by subtracting the momentum torque from the total braking torque. The phrase "braking coefficient" as used herein refers to the quotient of the ground torque divided by both the rolling radius and the normal force, the normal force being the force substantially normal to the landing surface at the area of contact between the wheel and the said surface. The normal force usually comprises that portion of the total vehicle weight supported by the wheel upon which braking torque is applied. The rolling radius is the apparent radius of the braked wheel and is equal to the quotient of the linear distance traveled by the braked wheel in one revolution of the wheel divided by $2\pi$, the said distance being equivalent to the apparent circumference of the tire.

Figure 1:
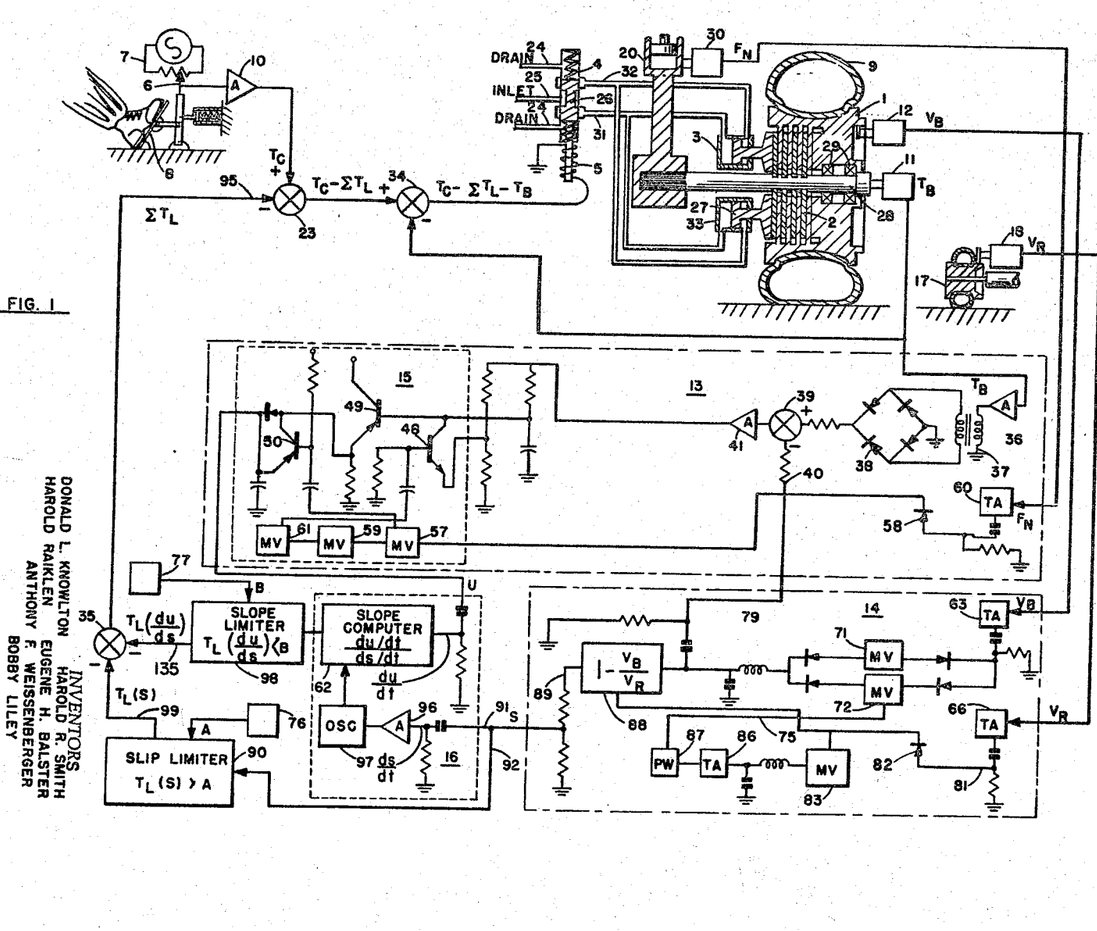
FIGURE 1 shows in schematic form an illustrative embodiment of the overall brake control system.

The brake control system disclosed herein comprises essentially a three-loop servo system, the first of which may be termed the pilot's control loop, while the remaining two are overriding signal loops. Referring to FIGURE 1 which shows an illustrative embodiment of the inventive concept, the system to be described includes a main landing wheel or primary rotating member 1 rotatably mounted on a shaft 28 by means of bearings 29. A brake 2 is provided adjacent the wheel 1 by means of which braking torque may be applied to the wheel when pistons 27 in the brake servomotor 3 are caused to move to the right as illustrated in FIGURE 1, by the downward movement of valve spool 26 in control valve 4, which may be of the self-centering type having opposed springs, one at each end of the valve spool. Downward movement of valve spool 26 admits pressure from inlet 25 from a pressurized source (not shown) to servomotor 3 through conduit 31 while conduit 32 permits the opposite side of pistons 27 to drain to a reservoir (not shown) through drain line 24. Brake release may be accomplished by upward movement of valve spool 26 thereby admitting pressure to servomotor 3 through conduit 32 leading from control valve 4. Movement of control valve element 26 may be accomplished electrically in several ways, and in FIGURE 1 results from energization of solenoid 5 which receives an electrical signal originating from some action of the vehicle operator calling for the application of braking force. This impulse may be initiated by movement of a foot pedal 8 connected to a wiper 6 in a potentiometer circuit 7 as shown in FIGURE 1, causing braking torque to be applied by the brake 2 in an amount proportional to the intensity of the initiating signal, within the range of torque values permitted by the second and third loops as described in detail below. The torque resulting from application of force by brake 2 upon wheel 1 is sensed by torque sensor 11. Torque sensor 11 provides a torque signal which is fed into mixer 34 to perform a limiting function. Thus, it will be seen that the circuit comprising potentiometer components 6, 7, valve 4, brake 2, torque sensor 11, mixers 23, 34, and the intermediate components comprises the first loop, herein referred to as the control loop, of a three-loop system.

The second loop in the control system shown in FIGURE 1 comprises means for determining wheel slip and braking torque, and overriding the signal initiated by potentiometer wiper 6 to limit the applied torque to an amount dependent upon a function derived from both the said parameters. Several different ways of modifying an input signal from potentiometer wiper 6 in response to various control factors as performed by mixer 23 will occur to those skilled in the art, one possible method utilizing an electronic gate circuit with a variable bias voltage applied by conductor 95 to diminish or interrupt the originating signal. The signal originating from movement of potentiometer wiper 6 is modified in response to brake system operating conditions as described in detail below. Bias voltage in conductor 95 is furnished by a portion of the overriding loop principally comprised of three computers shown by broken lines in FIGURE 1 and generally designated by reference numerals 13, 14 and 16.

The rotation of main wheel 1 causes a voltage output $V_B$ from signal generator 12 which may be used to determine the rotational speed of the wheel 1. The output from signal generator 12 is fed into a differentiating circuit comprising a slip computer generally designated by reference numeral 14. A reference wheel 17 is also provided, the rotation of which causes an output from signal generator 18 which is indicative of the rotational speed of wheel 17, symbolized $V_R$, and which is also fed into computer 14. Wheel 17 is an unbraked wheel which rotates at reference speed as defined above. Each of the said signals $V_B$ and $V_R$ may be applied to a trigger amplifier 63 and 66, respectively, to obtain a square wave signal for each of the said parameters. The output from amplifier 63 is conducted through diodes to multivibrators 71 and 72. The output from amplifier 66 may be conducted through a lead 81 to a full-wave rectifier 82, then to multivibrator 83 and in turn to amplifier 86, width control device 87 and multivibrator 72. The filtered output from multivibrators 71 and 72, proportional to the rotational speed of main wheel 1, and the output from full-wave rectifier 82, proportional to the rotational speed of reference wheel 17 are fed into quotient computer 88, by conductors 73 and 74, respectively. The output from computer 88 is proportional to the slippage of main wheel 1, which is determined by the relationship $$S \text{ (slippage)} = \frac{V_R - V_B}{V_R}$$

The outputs from multivibrators 71 and 72 are also differentiated to produce a signal proportional to the acceleration rate of the main wheel 1, and this signal is fed by conductor 79 into computer 13.

Computer 13 provides an output signal proportional to the brake coefficient, symbolized $u$, which necessitates input signals representing acceleration rate, normal force, and braking torque. An input signal proportional to the braking torque symbolized $T_B$ is obtained from signal generator 11 and fed into amplifier 36 thence in turn through transformer 37 and rectifier 38 to a mixer 39. Mixer 39 also receives the acceleration rate signal from conductor 79 after passage of the signal through resistor 40. The output from mixer 39 represents $T_G$ as computed by subtracting from the braking torque the product of the acceleration rate times the wheel moment of inertia. This output signal is fed into amplifier 41, the output from which is then fed into a quotient computer designated in FIGURE 1 by a broken line and generally denoted by reference numeral 15 which forms a component portion of computer 13. A signal in response to the normal force $F_N$ exerted on tire 9 by the runway surface in contact therewith may be furnished by a transducer 30 which may respond to the air pressure in a supporting shock strut such as denoted by 20, in which shaft 28 is fixedly mounted by splines preventing rotation of the shaft. The signal from transducer 30 as shown in FIGURE 1 is applied to a trigger amplifier 60, thence to rectifier 58 and then is fed into quotient computer 15. Computer 15, comprising multivibrators 57, 59, 61 and transistors 48, 49, 50, connected as shown, thus receives input signals representing ground torque $T_G$, and normal force $F_N$, and furnishes an output signal proportional to the function $$\frac{T_G}{F_N r}$$

herein termed the braking coefficient $u$. The rolling radius $r$ in this relationship is assumed to be constant. The output signals from computers 13 and 14, designated $u$ and $S$, repectively, are both fed into computer 16 which computes the slope by comparing the derivative of $u$ with the derivative of $S$, each with respect to time. Computer 16 receives input signal $S$ by means of conductor 91, and applies the derivative of $S$ through amplifier 96 and oscillator 97 to quotient computer 62, which also receives the derivative of $u$. The internal details of quotient computers 88 and 62 are similar to quotient computer 15. The output from computer 16 is conducted into slope limiter 98 which also receives a signal from a slope reference signal source 77. Slope limiter 98 compares the two input signals thus received, and supplies a signal to mixer 35 through conductor 135. Thus, it may be seen that the circuit generally comprising brake 2, torque sensor 11, generators 12 and 18, computers 13, 14 and 16, and mixers 35 and 23 comprises the second loop of the three-loop system referred to above.

The third loop of the system herein disclosed comprises signal generators 12 and 18, computer 14, slip limiter 90, mixers 23 and 35, and the hydraulic system components shown in FIGURE 1. The operation of this portion of the system is described in detail below. The slip or third loop portion of the system shown in FIGURE 1 is normally an emergency or protective brake control means and does not affect brake operation except when the second loop described hereinabove fails to function properly. When the second loop of the system shown in FIGURE 1 operates in the proper manner as described below, it prevents slip from becoming excessive, and hence the third loop remains inoperative or dormant until an abnormal condition such as malfunction in computers 13 or 16 occurs.

Figure 3:
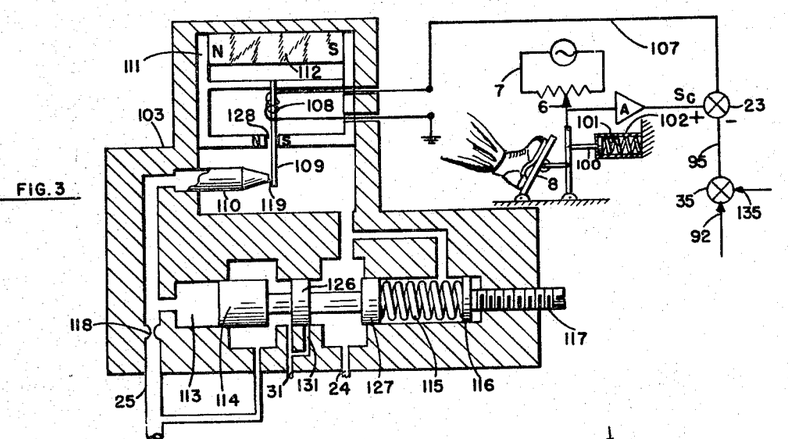
FIGURE 3 shows a modified arrangement for a portion of the system shown in FIGURE 1.

An alternative arrangement for the third loop, or that portion of the control system which limits brake operation in response to slip as depicted in FIGURE 1, is shown in FIGURE 3. If brake operation is made dependent upon wheel slip alone, that portion of the second loop in the system shown by FIGURE 1 used to measure brake coefficient or functions thereof may be omitted, such as computers 13, 16 and slope limiter 98. As thus modified, only the third loop would remain, and this system would not detect incipient skidding as early or as accurately as when all the components shown in FIGURE 1 are included. However, performance of the simplified system would enhance the landing characteristics of any vehicle using any additional brake control system with which the system herein disclosed may be combined.

In the alternative arrangement of FIGURE 3, valve 4 of FIGURE 1 is replaced by modulating valve 103 using essentially the same connections for both halves. Any valve which may vary the flow passing therethrough by an amount proportional to changes in an applied voltage may be substituted where valve 103 is shown in the alternative embodiment herein disclosed, provided only that the substitute valve has the necessary range and sensitivity. In the illustrative arrangement, hydraulic system pressure is applied to valve 103 by conduit 25, while conduit 24 leads to drain, and conduit 31 leads to servomotor 3 which may take the form shown in FIGURE 1. However, in the system of FIGURE 3, a conventional single-acting servomotor (not shown) consisting of a piston pressurized by fluid in one direction only may be employed to apply braking torque, the release of brakes being effected by spring or other means biasing the piston in the brake release direction in the usual well-known manner. Valve 103 contains a valve spool having three lands 114, 126 and 127. Land 114 is located within a chamber 113 which is filled with hydraulic fluid exerting pressure tending to move land 114 toward the right as illustrated in FIGURE 3. Land 127 bears against spring 115, this spring tending to move land 127 toward the left as shown in FIGURE 3. The opposite end of spring 115 bears against piston 116 which may be moved axially by adjusting screw 117. Thus, the valve spool upon which lands 114, 126 and 127 are mounted may be positioned by varying or balancing the forces acting on either end thereof. Valve 103 also contains a magnet which may take the form of a permanent magnet as shown at 112, positioned in an H core 111, at the lower end of which is a magnetic field between two poles comprising a magnetic gate 128. Fixed to the center cross-piece of the H core is a flapper 109, the lower end of which is movable sideways in the manner of a pendulum. A coil 108 surrounds the flapper 109. At the lower end of flapper 109 is a nozzle 110 from which hydraulic fluid normally flows at opening 119 therein. The fluid which fills chamber 113 and which flows from nozzle 110 is supplied from conduit 25 through a restriction 118.

As also shown by FIGURE 3, the slip signal output S from computer 14 is fed by conductor 92 directly to mixer 35 rather than through slip limiter 90 as in FIGURE 1. Moreover, the output from mixer 23 is applied to valve 103 by conductor 107 without the circuitry related to torque sensing signal $T_B$ being included in the arrangement of FIGURE 3.

Figure 4:
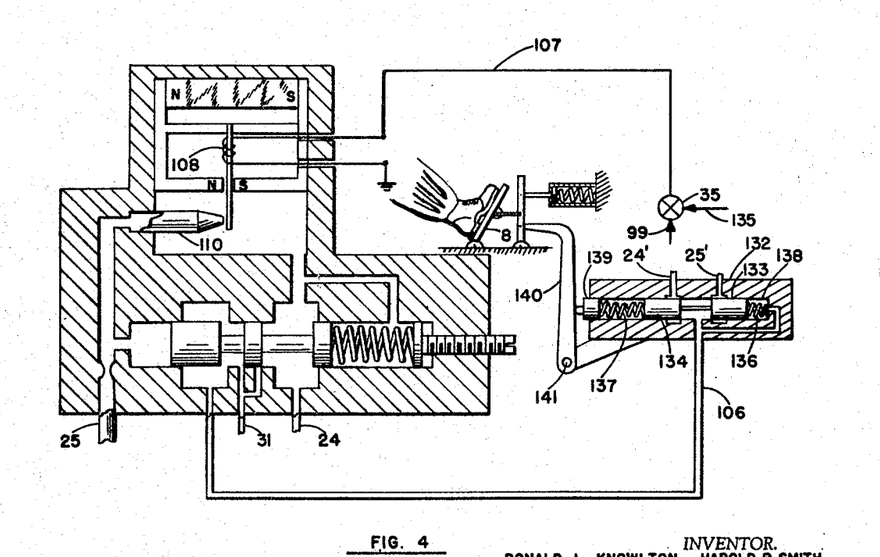
FIGURE 4 shows another modified arrangement for a portion of the system shown in FIGURE 1.

The alternative arrangement of FIGURE 4 employs a valve identical to valve 103 shown in FIGURE 3. However, valve 103 as used in the FIGURE 4 modified control system functions essentially as a by-pass return valve. Brake actuation employing the modified system of FIGURE 4 is initiated by foot operated pedal 8 acting upon hydraulic valve 132. Valve 132 contains a valve spool having two enlarged portions 133 and 134, each of which is acted upon by springs 136 and 137, respectively. Portion 133 is also acted upon by fluid pressure in chamber 138, the force of which adds to the biasing force of spring 136 tending to move portion 133 toward the left as drawn. The force of spring 137 acting to move portion 134 toward the right as drawn is varied by movement of plug 139 against which one end of spring 137 bears. Plug 139 is moved by rotation of link 140 about pivot 141, the direction of rotation depending upon whether pedal 8 is depressed or released. Valve 132 normally applies pressure to the brake-actuating servomotor except when valve 103 is actuated to interrupt communication between valve 132 and the servomotor, as explained more fully below.

As further shown by FIGURE 4, the output from mixer 35 is applied directly to valve 103. Since originating signal $T_C$ as used in FIGURE 1 is replaced by hydraulic means 132–141 for initiating brake actuation in the modification suggested by FIGURE 4, mixers 23 and 34 are eliminated.

In addition to the structure described above in connection with FIGURES 1, 3 and 4, an artificial feel system is included in each of the stated arrangements for the purpose of providing means by which the pilot may judge the relative intensity of the braking force which results from depressing pedal 8. In the absence of such means, the pilot would have little or no advance notice of the relative amount of braking force which he may expect to result from pedal movement. The artificial feel means may take any of several possible forms, such as the arrangement shown in FIGURE 3, for example. Piston 100 in this arrangement is connected by linkage to pedal 8 and is biased toward the brake-released position by resilient means such as compression spring 101 guided by cylinder 102 which is affixed to stationary structure.

Figure 5:
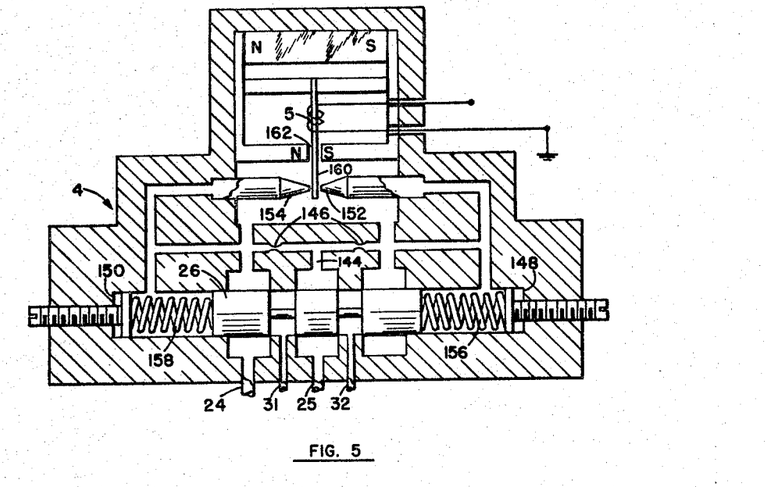
FIGURE 5 shows in greater detail the servo control valve used for control of the hydraulic brake-actuating servomotor shown in FIGURE 1.

FIGURE 5 is a more detailed schematic showing of valve 4 than the simplified schematic representation of this valve in FIGURE 1. Thus, although for the sake of simplicity an electrical signal is shown acting on valve spool 26 by coil means 5 in FIGURE 1, valve 4 may advantageously take the form shown in FIGURE 5 in which the electrical signal is applied to a coil which indirectly positions valve spool 26 by varying the fluid pressure at either end of the spool. The valve shown in FIGURE 5 permits greater accuracy and sensitivity of valve response to variations in input signals over a wider operating range than that normally permitted by a solenoid acting directly on a valve spool. The structure shown in FIGURE 5 is essentially similar to that described above in connection with valve 103 as shown in FIGURES 3 and 4, except that instead of fluid pressure acting on one end of the valve spool to control applied braking pressure, both ends of valve spool 26 shown in FIGURE 5 are acted upon by fluid pressure supplied by inlet conduit 25. Fluid thus supplied passes through a common conduit 144 and then divides to proceed through restrictions 146 to chambers 148 and 150 on each end of valve spool 26 and to nozzles 152 and 154 connected to each of the chambers, respectively. Flow from each of the nozzles determines the pressure in the chamber to which that nozzle is connected, which in turn determines the position of valve spool 26. Two compression springs 156 and 158 of equal strength are further provided to bias valve spool 26 in opposite directions, so that the spring forces combine with force resulting from fluid pressure in each of the stated chambers. Flow from each of the nozzles 152 and 154 is controlled by movement of flapper 160 which moves toward the right or left in response to the signal input of coil 5. In the absence of such a signal, flapper 160 assumes a neutral position as determined by the condition of magnetic gate 162 in the manner described in connection with magnetic gate 128 of FIGURE 3 set forth above. With flapper 160 in the neutral position, equal flow occurs from both nozzles 152 and 154, resulting in equal pressures on either end of valve spool 26 so that springs 156 and 158 automatically center the spool in the position shown in FIGURE 5.

*Operation*

In operation, using the system shown in FIGURE 1, the main wheel normally builds up to reference speed at the start of ground roll and continues to rotate substantially at reference speed until braking torque is applied. Braking torque is applied only when a signal is initiated by action of the pilot using foot pedal 8. This signal, herein termed the originating signal and symbolized $T_C$, passes through amplifier 10, mixers 23, 34 and coil 5, causing downward movement of valve spool 26 in the view shown by FIGURE 1, or rightward movement of valve spool 26 as drawn in FIGURE 5. Valve spool 26 moves toward the right in FIGURE 5 due to the lower end of flapper 160 swinging toward the left, which permits greater flow from nozzle 152 and less from nozzle 154. Thus, fluid pressure in chamber 148 drops and in chamber 150 increases, moving valve spool 26 in the manner stated. Brake system fluid is applied through conduit 31 to the left side of pistons 27, causing braking force to be applied to resist rotation of wheel 1. The amount of torque applied by brakes 2 depends in part upon the intensity of the originating signal $T_C$, which, in the structure shown in FIGURE 1 depends upon the amount of displacement of pedal 8. The torque resulting from movement of pistons 27 in applying the brakes is sensed by signal generator 11, and this signal is applied to mixer 34 to modify the originating signal $T_C$ as may be required to correlate the amount of torque called for by the pilot's control signal with the amount actually obtained. When excessive torque is obtained at wheel 1 for any reason, the signal output from generator 11 will sense this and the effect of this signal upon the output from mixer 34 will alter the position of valve spool 26 to decrease the pressure applied to servomotor 3. This action lessens the force of pistons 27, reducing the torque and consequently the intensity of the signal from generator 11.

Figure 2:
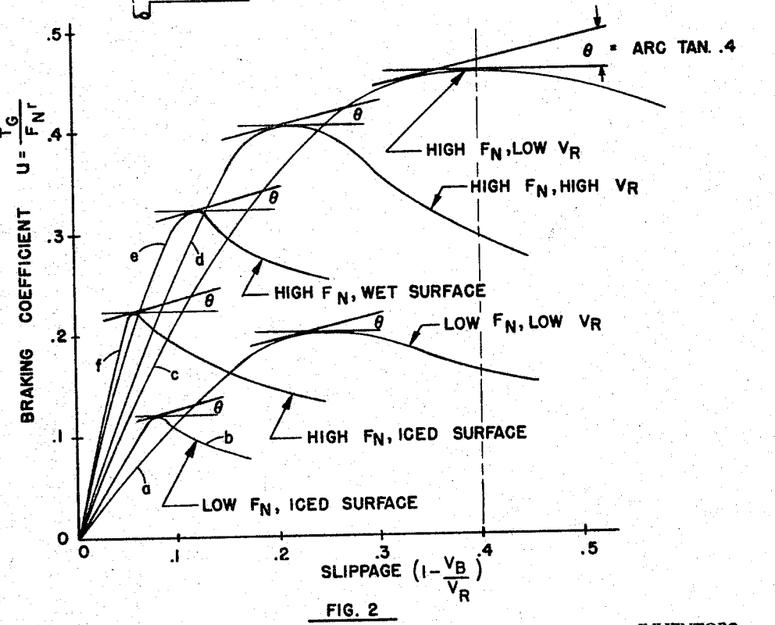
FIGURE 2 shows a performance curve illustrating graphically the operational characteristics of the structure shown in FIGURE 1 during various conditions of use.

In addition to applied torque, the relative speeds of wheel 1 and reference wheel 17 are sensed by means of which computer 14 automatically computes the slippage of wheel 1 resulting from use of brake 2. The signal proportional to slip as computed by computer 14 is fed by conductor 92 to slip limiter 90 which also receives a signal A from a slip reference signal source designated 76 in FIGURE 1. Signal A is proportional to the desired maximum limiting value of slippage. Slip limiter 90 may contain, for example, a relay which is triggered by a signal input from lead 92 equal in intensity to the input from signal source 76. Actuation of the relay mechanism in slip limiter 90 may cause a signal in conductor 99 of such character as will upon reaching mixer 23, override the signal output from amplifier 10, causing automatic brake release. Upon release of the brake, the consequent reduction of braking torque permits acceleration of the braked wheel reducing the amount of slippage. The effect of lower slippage upon the output signal from computer 14 permits reapplication of the originating signal. The third loop thus serves to limit brake operation in response to slip, and automatically releases the brakes in the event that slip becomes excessive for a preselected period of time. In addition to the slippage overriding signal, a slope signal is capable of overriding the originating signal. The slop signal is proportional to the slope of the curve of braking coefficient plotted against slippage, the characteristics of which are shown by FIGURE 2. This slope is symbolized tan $\theta$, and is computed from the braking coefficient $u$ and the slip S during actual landing conditions. FIGURE 2 shows a family of brake system performance curves $a$ through $f$, each curve representing a particular hypothetical set of landing conditions. The curves $a$–$f$ shown herein are not intended to apply to every possible landing, but merely illustrate typical variations in the relationship between slippage and brake coefficient occurring during use of the system. These variations, as stated above, may depend upon differing coefficients of friction between the tires and the landing surface, tire pressures, vehicle weight, forward speeds, and rate of lift decay during ground roll. Curve $a$, for example, graphically shows the stated relationship in a hypothetical case during the ground roll of the vehicle landing without much weight or forward speed, such as an unloaded vehicle having relatively little fuel in the tanks, with flaps and speed brakes extended. Thus, each time a vehicle lands, the relationship between slippage and braking coefficients during brake application varies so that a particular curve would be applicable. The brake control system shown in FIGURE 1 does not assume any particular relationship or curve between slippage and brake coefficient, but computes the slope of the performance curve resulting from the precise landing conditions which exist at the time the landing is actually made. This slope is defined by an angle $\theta$ lying between two lines both tangent to the performance curve, one being a horizontal datum line at the zenith denoting a slope of zero, and the other representing the slope at a point on the curve which contacts the line. The tangent of the angle $\theta$ is thus a direct measure of the curve slope at the stated point of contact, and is continually measured by computers 13, 14 and 16 during ground roll. During the upward trend of the performance curves starting from zero as shown in FIGURE 2, the slope remains in the positive condition during which the braking coefficient $u$ is increasing, but at a gradually slower rate. At the curve zenith on each of curves $a$–$f$, the slope has decreased to the zero or horizontal state, and then turns negative. Thus, during the early portion of each curve, the tangent value of $\theta$ is gradually decreasing from a maximum close to the origin and ultimately becomes zero at the top of the curve. The absolute maximum braking efficiency is obtained at the zenith point on the performance curve. However, this point represents an extremely unstable braking condition in that a negative slope of the performance curve denotes a skid, and the point of zero slope is the point of incipient skid. Control of braking torque at this precise point is impractical and unfeasible due to the highly sensitive relationship between the factors affecting brake system operation at this performance point. Thus, only an extremely minute increase of braking force in excess of that producing zero slope on the curve could precipitate a severe skidding condition. Since the system is intended to prevent skidding, the limiting slope causing automatic release of the brakes should be sufficiently positive to permit a reasonable range of torque values within which slight variations in system response may be tolerated without any resultant skidding. For the sake of illustration, a tangent value of .4 has been selected as the limiting slope for the curves of FIGURE 2. Thus, during operation of the brake control system shown in FIGURE 1 at any of the various landing conditions noted for curves $a$–$f$ in FIGURE 2, the brakes would be automatically released when the tangent value of $\theta$ as determined by computer 16 decreases to a value of .4. This value may remain constant as shown by the angle $\theta$ remaining unchanged for each of the curves $a$–$f$ on FIGURE 2, and results in operation of the brake at a limiting value of torque almost at the precise point of maximum efficiency on each performance curve. The slope signal output from computer 16 is applied to slope limiter 98, and is therein compared with a reference slope signal B from slope reference signal source 77. When the actual slope signal from computer 16 reaches the limiting conditions as determined by the reference slope signal from source 77, such as a tangent value of .4 as shown by FIGURE 2, the originating signal $T_C$ is overridden to release the brake automatically. This is accomplished by an output signal from slope limiter 98 which overrides all other signals to move valve spool 26 upwardly. Release of the brakes naturally permits increase of wheel speed and decrease of braking torque, so that the tan $\theta$ value changes, and braking torque is reapplied by lowering valve spool 26 when the slope signal from computer 16 is again within the acceptable limit. This action may occur very rapidly. Thus, when excessive braking force is called for by the originating signal, the slope signal circuit causes alternate release and reapplication of braking torque at a rapid rate, to maintain braking force within a certain narrow range of values, resulting in operation of the brakes at a nearly constant point on the performance curve of FIGURE 2 reflecting the actual conditions of use, this point being commensurate with the point of brake operation at maximum efficiency. The slip limiter 90 may also cause alternate release and reapplication of brakes, but the amount of slippage which would result in automatic brake release is preselected to avoid conflict between the two control parameters. Thus, the limiting rate of slippage causing automatic brake release by slip limiter 90 is materially greater than the slippage rate occurring at the time the brakes are automatically released by slope limiter 98. Thus, the slope signal will normally control automatic release or reapplication of braking torque, while the slip overriding signal will normally act to release the brakes only in the event that excessive slippage occurs by reason of the failure of slope limiter 98 to release the brakes.

As shown by FIGURE 2, an arbitrary value of slippage such as .4 may be used as the limiting factor for brake operation and would provide protection against severe skidding while not interferring with normal brake system performance as limited by slope limiter 98.

Operation of the system shown in FIGURE 1 as modified according to the changes suggested by FIGURE 3 will now be described. The system suggested by FIGURE 3 may be referred to as a slip command type of brake control rather than a torque command type. This means that the pilot operated pedal 8 shown in FIGURE 3 originates a signal $S_C$ which represents a desired amount of slippage, and sufficient braking force will be applied in response to this signal to produce the stated amount of slippage. Thus, movement of pedal 8 causes signal $S_C$ to originate from potentiometer circuit 7 from whence it is applied to mixer 23 and then to coil 108 in valve 103. The magnetic influence of coil 108 on flapper 109 causes flapper movement toward the left, decreasing the flow from nozzle 110 which increases the fluid pressure in chamber 113 and moves the valve spool toward the right to the position shown in FIGURE 3 wherein land 126 permits inlet pressure from conduit 25 to enter fluid passage 31 leading to the brake actuating servomotor. The resulting brake actuation retards rotation of the brake wheel causing a slip signal S to be emitted by computer 14. Slip signal S representing the actual slip resulting from brake actuation is sent from computer 14 through conductor 92 to mixer 35, thence to mixer 23. In the event that a slip greater than that represented by the originating signal $S_C$ actually occurs, for example, the effect of slip signal S on the output from mixer 23 alters the position of flapper 109 to decrease the pressure in chamber 113, causing spring 115 to move land 126 toward the left, opening passage 131 to drain, and reducing the applied pressure in conduit 31 to cause the actual slip as reflected by signal S to correspond to the desired slip as represented by the originating signal $S_C$.

In the modified system of FIGURE 3, the signal from slope limiter 98 may be fed by conductor 135 to mixer 35 and, as thus connected, would serve to override the slip signal from computer 14 and amplifier A and cause automatic brake release by moving flapper 109 to the position resulting in maximum flow from nozzle 110 in the event that an incipient skid as determined by the limiting value for brake coefficient $u$ occurred. Whether used alone, or in conjunction with the slope control feature of the structure shown in FIGURE 1, the modified brake control system suggested by FIGURE 3 would operate substantially in the manner described.

Operation of the system shown in FIGURE 1 as modified according to the changes suggested by FIGURE 4 will now be described. The modified system of FIGURE 4 does not provide brake operation in response to an originating signal representing a desired amount of torque or of slippage, as in the case of systems shown by FIGURES 1 and 3, respectively, but applies braking force in an amount proportional to the fluid pressure resulting from actuation of pedal 8. Thus, for example, depression of pedal 8 to apply the brakes causes rotation of link 140 clockwise about pivot 141, moving plug 139 toward the right. Rightward movement of plug 139 increases the compression force of spring 136 acting upon portion 134 of the valve spool in valve 132, and causes the valve spool to move slightly to the right as drawn. This action causes flow from inlet conduit 25' into conduit 106 leading to the brake servomotor through valve 103. In the modification shown by FIGURE 4, the valve spool containing lands 114, 126 and 127 within valve 103 normally remains in the position shown, so that valve 132 is normally in direct communication with the brake-actuating servomotor through lines 106 and 31. Since the pressure in conduit 106 is communicated to chamber 138 by a small branch line within valve 132, the chamber pressure builds up and combines with the force of spring 136 to cause movement of the valve spool in valve 132 toward the left, isolating line 106 from both conduits 24' and 25'. The amount of braking force resulting from any given amount of depression of pedal 8 will depend upon the pressure in line 106, and substantially this amount of braking force will be sustained as long as line 106 remains under the pressurized condition existing at the time line 106 is isolated from lines 24' and 25' by the valve spool. Conversely, the brakes are released by release of pedal 8 which moves link 140 counter-clockwise about pivot 141, permitting movement of plug 139 toward the left under the influence of compression spring 136. Leftward movement of plug 139 lessens the force of spring 136 on portion 134 so that the valve spool in valve 132 likewise moves toward the left, conecting line 106 with drain line 24'. The consequent decrease of pressure in line 106 results in a decrease in the pressure within chamber 138, lessening the force which acts on the right side of portion 133. Since the action of spring 136, tending to move the valve spool in valve 132 toward the right, is opposed by lesser force when fluid pressure in chamber 138 decreases, rightward movement of the valve spool results under the influence of this spring, causing line 106 to be again isolated from both lines 24' and 25'. Brake actuation is therefore normally dependent entirely upon the fluid pressure initiated by the action of pedal 8 on valve 132, and valve 103 in FIGURE 4 does not interrupt brake actuation except in response to an electrical signal applied to coil 108. No such signal is applied except when the force applied to the brakes by valve 132 causes either excessive slippage or incipient skidding as determined by the signal outputs from slip limiter 90 and slope limiter 98, respectively. The signals from both of these limiters are fed into mixer 35 and thence to coil 108 as shown in FIGURE 4, so that a signal originating from either slip limiter 90 or slope limiter 98 would alone suffice to energize coil 108. This action causes movement of flapper 109 toward the right, resulting in maximum flow from nozzle 110 with consequent drop in pressure within chamber 113. This permits spring 115 to move the valve spool in valve 103 toward the left as drawn, whereupon land 126 closes off conduit 106 from conduit 31, and connects conduit 31 to drain line 24 by means of passage 131. With conduit 31 connected to drain, the brakes are automatically released, and remain so until the condition which caused energization of coil 108 is no longer existent. With coil 108 de-energized, flapper 109 automatically returns to the undisturbed condition whereupon flow from nozzle 110 is restricted and the resulting pressure build-up in chamber 113 moves the valve spool in valve 103 toward the right, so that land 126 again permits communication between line 106 and line 31. When such communication is re-established, the pressure in line 106 can again be increased or decreased to apply or release the brakes. Whether used alone, or in conjunction with the slope control features of the structure shown in FIGURE 1, the modified brake control system suggested by FIGURE 4 would operate substantially in the manner described.

While the particular brake control system components described above are fully capable of attaining the objects and providing the advantages herein stated, it is clear that

We claim:

1. In an automatic wheel brake system; means for actuating a brake to apply braking torque to said wheel during normal braking, brake-release means to effect release of said brake, means for substantially continuously measuring actual slippage of said wheel, means for substantially continuously measuring said applied torque, means for determining the rate of change of said slippage, means for determining the rate of change of said torque, and computer means for solving a function dependent upon said rates of change of slippage and torque, and providing a signal to actuate said brake release means in response to a condition of incipient skidding as determined by said function.

2. The brake control system improvement set forth in claim 1 together with automatic means operatively related to said means for determining said rate of change of said slippage for actuating said brake-release means in response to a predetermined rate of slippage of said wheel.

3. The brake control system set forth in claim 1 in which said means for actuating a brake includes a fluid operated servomotor connected to said brake, a supply of fluid under pressure, and a valve for applying fluid under pressure to said servomotor, said valve having means for varying said force in response to an electrical input signal, and signal means operatively related to said means for determining said rate of change of slippage, said signal means being responsive to a predetermined rate of slippage caused by brake actuation for furnishing said input signal.

4. The brake control system improvement set forth in claim 2 having signal means to actuate said brake actuating means to produce a desired braking torque, sensing means for determining the torque resulting from brake actuation, and means for overriding the said actuating means to release the brake when said resulting torque exceeds the desired amount.

5. In a brake system, the combination of; a primary rotating member adapted to contact a substantially plane surface, a brake for retarding rotation of said primary member, hydraulic means for actuating said brake, signal means to actuate said hydraulic means, means for measuring the slippage between said primary rotating member and said surface, means for measuring the ground torque causing rotation of said primary member as a result of said contact, means for measuring the force substantially normal to said surface tending to maintain contact between said member and said surface, means for computing the braking coefficient which results from dividing said ground torque by said substantially normal force, means for differentiating each of said slippage and said braking coefficient with respect to time, means for computing the quotient of said braking coefficient differential divided by said slippage differential at any instant of time, means for limiting the application of said braking torque by said hydraulic means to a value less than that which produces a predetermined value for said quotient.

6. The brake control system improvement set forth in claim 5 having in addition thereto, limiting means actuated in response to slippage above a predetermined amount of slippage for limiting the amount of braking torque applied to said wheel.

7. The brake control system improvement set forth in claim 5 having means for overriding the said signal means to release the brake when braking torque exceeds the desired amount.

8. The combination set forth in claim 7 above, in which said hydraulic means for applying braking torque includes a fluid source, a servomotor connected to said brake, and a valve for applying fluid force to said servomotor, said valve including in combination therewith, means responsive to slippage for causing partial release of said brake.

9. In an automatic wheel brake system; a wheel brake, actuating means for actuating said brake, brake-release means for effecting partial release of the brake, means for determining actual slippage of said wheel, means for determining the rate of change of said actual slippage resulting from actuation of said brake, and automatic means operable to actuate said brake-release means in response to a predetermined rate of slippage of said wheel.

10. In an automatic wheel brake system as set forth in claim 9 above, said actuating means including a fluid source, a servomotor connected to said brake, and a valve for applying fluid force from said source to said servomotor, said valve being connected to said source and having means for varying said force in response to an electrical input signal furnished by said automatic means to effect partial release of said brake.

11. An automatic wheel brake control system comprising; a main wheel rotatably mounted on a shaft, means for applying braking torque to said wheel, means for determining the actual slippage of said wheel according to the function $$\frac{V_R - V_B}{V_R}$$

where:

$V_R$ = the rotational speed of said main wheel in the absence of braking torque, and $V_B$ = the rotational speed of said main wheel as a result of the application of said braking torque, and limiting means actuated in response to a predetermined amount of slippage for limiting the maximum amount of braking torque applied to said wheel to that amount which produces said predetermined amount of actual slippage.

12. An automatic wheel brake control system as set forth in claim 11, above, said means for applying braking torque including a fluid operated servomotor connected to said brake, a source of fluid under pressure, and a valve for applying fluid force to said servomotor, said valve having means for varying said force in response to an electrical input signal furnished by said limiting means to effect partial release of said brake for limiting the braking torque of said brake.

13. An automatic wheel brake system comprising; a main wheel, means for applying braking torque to said wheel, means for actuating said braking means to produce a desired braking torque, means for determining the slippage of said wheel, limiting means actuated in response to a predetermined amount of slippage for limiting the amount of braking torque applied to said wheel, sensing means for determining the torque resulting from brake actuation, means for overriding the said actuating means to release the brake when said resulting torque exceeds the desired amount.

14. In a brake control system; a supply of fluid under pressure, a servomotor for actuating a brake, a valve connected between said fluid supply and said servomotor for communicating fluid pressure to said servomotor, a by-pass valve connected between said valve and said servomotor, means for determining the rate of change of slippage resulting from actuation of said brake, means for determining the rate of change of braking force applied to said brake by said servomotor, and computer means for computing a function of the said rates of change of slippage and braking force, comparing the computed value with a predetermined value indicative of incipient skidding, and automatically actuating said by-pass valve to interrupt said communication and connect said servomotor to drain when said condition of incipient skidding results from brake actuation.

15. In an automatic braking system for a vehicle: support means connected to said vehicle for supporting a portion of the weight of said vehicle, said support means including rotational means rotatably journaled on said support means and adapted to contact a surface, brake means operatively related to said rotational means for retarding the rotation thereof by application of braking force to said rotational means, first signal means operatively related to said brake means for providing a first signal proportional to said applied braking force, second signal means operatively related to said support means for providing a second signal proportional to said portion of weight, third signal means for providing a third signal proportional to the actual slippage occurring between said rotational means and said surface during said application of braking force, fourth signal means operatively related to said rotational means for providing a fourth signal proportional to the momentum torque of said rotational member during said application of braking force thereto, brake release means operatively related to said brake means for reducing said braking force, computer means operatively related to said first, second and third signal means for receiving said first, second, and third signals for computing Tan $\theta$, and limit means operatively related to said computer means and said brake release means for actuating said brake release means to release said applied braking force at a predetermined value of Tan $\theta$ in the relationship:

$$\text{Tan } \theta = \frac{\frac{du}{dt}}{\frac{dS}{dt}}$$

where:

$u$=the quotient of the total braking force minus the momentum torque of said rotational means divided by said portion of vehicle weight,
$S$=the amount of said actual slippage, and
$t$=time.

16. In a brake control system: a flexible rotatable element adapted to contact a surface, torque means for applying braking force to retard rotation of said element, command signal means for providing a command signal proportional to a desired amount of slippage between said element and said surface during application of said braking force within a range of slippage values, response signal means for providing a response signal proportional to the actual slippage produced between said element and said surface by said command signal means, means for electrically combining said command signal with said response signal to provide a comparison thereof, and means for actuating said torque means in response to said signal comparison to maintain said braking force whereby said actual slippage substantially coincides with said desired amount of slippage.

17. The structure set forth in claim 16 above including in addition thereto, means for limiting said range of slippage values to a maximum value less than the amount of slippage at which skidding begins to occur.

18. In a brake control system; means for applying braking force within a range of values in response to an initiating signal proportional to a desired rate of slippage, and limiting means for limiting the maximum value within said range to that braking force which produces the said desired rate of slippage, said means for applying braking force includes valve means and servomotor means, said servomotor means connected to said brake for actuating and releasing said brake, said valve means connected to said servomotor means for applying pressure in varying amounts to said servomotor to actuate said brake and apply braking force in an amount proportional to said applied pressure, said valve means being adapted to vary said pressure in response to an input signal, and said limiting means includes means for computing the actual slippage resulting from brake actuation and furnishing a signal proportional to said actual slippage, said valve input signal comprising the resultant from combining said initiating signal with said actual slippage signal, and means for combining said initiating signal with said actual slippage signal to supply said input signal to said valve means.

19. In a brake control system; means for applying braking force within a range of values in response to an initiating signal proportional to a desired rate of slippage, and limiting means for limiting the maximum value within said range to that braking force which produces the said desired rate of slippage, in combination with automatic means operable to override said initiating signal and actuate said valve to release said braking force in response to a condition of incipient skidding as determined by a function of the rate of change of slippage and the rate of change of braking force means for measuring rates of change of slippage and of braking torque, and means operatively related to said automatic means for computing said function and operating said automatic means in response to said condition.

20. In a brake system for retarding translational movement of an object; a member rotatably mounted on said object and adapted to contact a substantially plane surface, brake means for applying braking torque to retard the rotation of said member, means for determining the actual slippage of said member with respect to said surface, means for determining the actual torque causing rotation of said member, means for measuring the rates of change of said slippage and said torque, ratio means for determining the actual ratio of said rates, limit means for comparing said actual ratio with a predetermined limiting ratio thereof, and limit means for acting on said brake means to release said brake when said actual ratio corresponds substantially with said limiting ratio.

21. In a brake control system; a supply of fluid under pressure, a servomotor for actuating a brake, a valve connected between said fluid supply and said servomotor for communicating fluid pressure to said servomotor, a by-pass valve connected between said valve and said servomotor, and means for automatically actuating said by-pass valve to interrupt said communication and connect said servomotor to drain in response to a condition of excessive slippage above a predetermined slippage rate, said means for automatically actuating said by-pass valve including; means for determining the rate of change of slippage resulting from actuation of said brake, means for determining the rate of change of braking force applied to said brake by said servomotor, and computer means for computing a function of the said rates of change of slippage and braking force, comparing the computed value with a predetermined value for said function indicative of incipient skidding, and automatically actuating said by-pass valve to interrupt said communication and connect said servomotor to drain when said condition of incipient skidding results from brake actuation.

References Cited in the file of this patent

UNITED STATES PATENTS

| | | |
|---|---|---|
| 2,308,499 | Eksergian | Jan. 19, 1943 |
| 2,468,199 | Hines | Apr. 26, 1949 |
| 2,515,729 | Morrison | July 18, 1950 |
| 2,913,072 | Williams | Nov. 17, 1959 |
| 2,920,924 | Reswick et al. | Jan. 12, 1960 |